United States Patent
Hasegawa et al.

(10) Patent No.: US 6,486,743 B2
(45) Date of Patent: Nov. 26, 2002

(54) DEVICE FOR DRIVING AND DETECTING OSCILLATOR

(75) Inventors: Kazuo Hasegawa, Miyagi-ken (JP); Daisuke Takai, Miyagi-ken (JP)

(73) Assignee: Alps Electric Co. LTD, Tokyo (JP)

( * ) Notice: Subject to any disclaimer, the term of this patent is extended or adjusted under 35 U.S.C. 154(b) by 0 days.

(21) Appl. No.: 09/875,832

(22) Filed: Jun. 5, 2001

(65) Prior Publication Data

US 2001/0052824 A1 Dec. 20, 2001

(30) Foreign Application Priority Data

Jun. 14, 2000 (JP) .................................... 2000-178173

(51) Int. Cl.$^7$ .............................. H01L 41/06; H03B 1/00
(52) U.S. Cl. .................... 331/25; 331/74; 331/158; 310/317; 310/319; 310/316.01
(58) Field of Search ............... 331/25, 74, 158; 310/317, 316.01, 319; 73/505

(56) References Cited

U.S. PATENT DOCUMENTS

| | | |
|---|---|---|
| 5,197,331 A | 3/1993 | Oikawa |
| 5,696,420 A | 12/1997 | Inanaga et al. |
| 6,053,044 A | 4/2000 | Ohnishi et al. |
| 6,255,760 B1 * | 7/2001 | Hasegawa et al. ..... 310/316.01 |

FOREIGN PATENT DOCUMENTS

| | | |
|---|---|---|
| EP | 0683381 A2 | 11/1995 |
| JP | 7-244064 | 9/1995 |

* cited by examiner

*Primary Examiner*—Robert Pascal
*Assistant Examiner*—Kimberly E Glenn
(74) *Attorney, Agent, or Firm*—Beyer Weaver & Thomas LLP

(57) ABSTRACT

When output signal of an oscillator are binarized by binarization means, a timing signal for driving a sequence controller for controlling a correction portion is rested temporarily. The process for overwriting the contents of an E$^2$ROM of the correction portion side with an RAM is rested temporarily. This can prevent noise product at the overwriting timing. Binary signals after binarization can be prevented from being varied. The oscillator can be driven stably so as to give an angular speed output with high accuracy.

4 Claims, 7 Drawing Sheets

DEVICE FOR DRIVING AND DETECTING OSCILLATOR

BACKGROUND OF THE INVENTION

1. Field of the Invention

The present invention relates to a device for driving and detecting an oscillator for use in, for example, an angle sensor, more specifically, to a device for driving and detecting an oscillator so as to stably drive and detect the oscillator by removing noise produced in the sensor.

2. Description of the Prior Art

FIG. 7 is a block diagram showing a conventional device for driving and detecting an oscillator as well as the construction of part of a angular speed sensor.

The angular speed sensor shown in FIG. 7 has an oscillator 1 as sensing means, a drive control portion for oscillating and driving the oscillator 1 at a predetermined driving frequency, a detection control portion for detecting an angular speed outputted from the oscillator 1, and a correction portion for making sensitivity adjustment and offset adjustment for the oscillator 1 varied by temperature.

The oscillator 1 is, for example, a piezoelectric type oscillator or a capacitance type oscillator, and has a plurality of oscillation legs (for example, three legs) formed in a branched manner at one of the ends of the oscillator 1 extending longitudinally. A pair of input electrodes extending longitudinally are formed in one of the faces of each of the oscillation legs, and a pair of output electrodes are likewise formed in the other face (not shown). In the oscillator 1, when a sine-wave driving signal is given from a drive means 6 to the input electrodes of each of the oscillation legs, the oscillation legs are oscillated and driven in the direction in which the oscillation legs are aligned. In this state, when the oscillator 1 is placed on the longitudinal axis, Coriolis force produced corresponding to the magnitude of rotation allows the oscillator 1 to be deflected and deformed in the direction orthogonal to the oscillation direction. In this deformation, a pair of the output electrodes defined in the other face formed in the oscillator 1 output output signals of different phases corresponding to the magnitude of the Coriolis force.

The drive control portion is constructed of a PLL (phase-locked loop) consisting of binarization means 2, a phase detection portion 3, a VCO (voltage control oscillator) 4, a frequency divider 5, and the drive means 6. When a driving signal SD is outputted from the drive means 6 and inputted to the oscillator 1, output signals S1, S2 are outputted from the oscillator 1.

The phase detection portion is constructed of the phase difference detection portion 3 and a low-pass filter 7, and outputs an angular speed output Sp corresponding to the magnitude of the Coriolis force based on the phase difference between the both output signals S1, S2 outputted from the oscillator 1. An oscillating signal generated by the VCO 4 is frequency-divided by the frequency divider 5. The resulting signal is then sent out, as a reference signal Dref, to a sequence controller 9 at the correction side.

The correction portion is constructed of correction means 8, the sequence controller 9, an E²PROM 10, an E²PROM interface 11, a RAM (Random Access Memory) 12, and a temperature sensor 13. The correction means 8 has a correction circuit 8A consisting of a sensitivity correction circuit, an offset correction circuit, and a temperature coefficient correction circuit, and amplification means 8B.

The E2PROM 10 holds various initial data pieces for sensitivity adjustment, offset adjustment, and temperature coefficient of the oscillator 1 at a certain temperature (for example, 20° C.). In the correction means 8, the respective initial data pieces held in the E²PROM at predetermined time intervals based on the reference signal Dref given from the frequency divider 5 under control of the sequence controller 9 are sent out through the E²PROM interface 11 to the RAM 12. In other words, the contents of the RAM 12 is always overwritten with the initial data pieces having the same contents. When the contents of the initial data pieces recorded into the RAM 12 are changed even temporarily due to the influence of noise, the original initial data pieces can be returned immediately.

The correction circuit 8A is provided in its interior with D/A conversion means, not shown, for converting each piece of the initial data pieces to an analog signal. The correction circuit 8A is also fed temperature data piece detected by the temperature sensor 13. The correction circuit 8A selects a sensitivity correction value, a temperature correction value, and a temperature coefficient based on the temperature data piece detected by the temperature sensor 13, and determines a proper amount of offset. The amount of offset is given to the amplification means 8B so as to correct the angular speed output Sp outputted from the phase detection portion 3. The corrected output, whose high-frequency component is removed by the low-pass filter, is outputted as a final angular speed output Sp'.

The conventional device for driving and detecting an oscillator has the following problems.

In the abovementioned construction, for example, the binarization process in the binarization means 2 is performed at a frequency in which the frequency of the oscillating signal of the VCO 4 is frequency-divided bisectionally five times (1/32 times), and writing from the E²PROM 10 to the RAM 12 is performed at a frequency in which the oscillating signal of the VCO 4 is frequency-divided bisectionally (1/2 times). In this case, the timing in which the output signals S1, S2 of the oscillator 1 are binarized by the binarization means 2, and the timing in which the respective initial data pieces in the E²PROM are written into the RAM 12 in the correction portion, correspond with each other once in every 16 times.

When the respective initial data pieces of the E²PROM 10 is written into the RAM 12, noise tends to occur.

When the timings of both correspond with each other, a whisker noise is superimposed on the input signal of the binarization means 2 (an output signal of the oscillator 1 and/or a threshold value for binarizing the output signal). When the timings of both do not correspond with each other, the whisker noise is not superimposed on the input signal at all.

As described above, when the whisker noise is superimposed on the input signal, binary signals D1, D2 are varied, and the phase difference between the both signals is also varied due to the variation. For this reason, the control voltage of the VCO 4 is fluctuated, so that the oscillating signal of the VCO 4 is also varied. This fact causes the signals of the entire driving and detecting device to be varied. Since this state is just similar to the state the driving signal SD for driving the oscillator 1 is FM-modulated, the oscillator 1 cannot be driven stably.

The binary signals D1, D2 themselves are varied at a relatively high frequency, but the angular speed output Sp outputted from the phase difference detection portion 3 is varied at a low frequency. It is thus difficult to remove the variation in the low-pass filter 7 at the later stage. The angular speed output Sp' with high accuracy cannot be detected.

SUMMARY OF THE INVENTION

The present invention solves the foregoing conventional problems, and an object of the present invention is to provide a device for driving and detecting an oscillator so as to be driven stably without being affected by noise.

Another object of the present invention is to provide a device for driving and detecting an oscillator so as to detect an angular speed with high accuracy without being affected by noise.

According to the present invention, a device for driving and detecting an oscillator comprises an oscillator for outputting output signals of different phases when an angular speed is given, a drive control portion for driving the oscillator, and a detection control portion for detecting the angular speed output based on the output signals of the oscillator, the detection control portion having binarization means for converting the both output signals to binary signals corresponding to the amplitude polarity, a phase detection portion for detecting the angular speed output based on the phase difference component between the both binary signals, a correction portion for performing a correction process for the output of the phase detection portion corresponding to the characteristic of the oscillator, and data holding means provided in the correction portion for holding the contents of memory overwritten with data pieces stored in a data store portion, wherein the operation of the data holding means is controlled so as to temporarily rest the overwriting of the memory for a fixed period including the time for switching the amplitude polarities in the binarization means.

In the present invention, the operation of a noise producing source (the data holding means) is stopped temporarily for a fixed period before and after, and including the timing for switching in the binarization means. Thus, the binary signals as the output of the binarization means can be prevented from being varied.

In the present invention, preferably, the device for driving and detecting an oscillator further comprises a controller for controlling the overwriting process for the memory in the data holding means, wherein supply of a timing signal (Sc) as the operational reference of the controller is stopped for the fixed period, so as to temporarily rest the overwriting of the memory.

The drive control portion has a voltage control oscillator for controlling the oscillating frequency based on the output signal of the oscillator, and frequency dividing means for frequency-dividing a signal outputted from the voltage control oscillator so as to generate a driving signal of the oscillator, wherein the outputs of flip-flops constructing the frequency dividing means are combined to generate the timing signal (Sc) having the rest period.

In the abovementioned construction, the signal inputted to the frequency dividing means is combined with any one of the output signals of a plurality of the flip-flops constructing the frequency dividing means. Thus, the time width of the rest period can be set optionally. Since the rest period can afford time previously, the construction cannot be affected even when the time for producing noise is somewhat extended.

In the present invention, the oscillator can be a piezoelectric type oscillator or a capacitance type oscillator.

DESCRIPTION OF THE PREFERRED EMBODIMENTS

Figure 1:
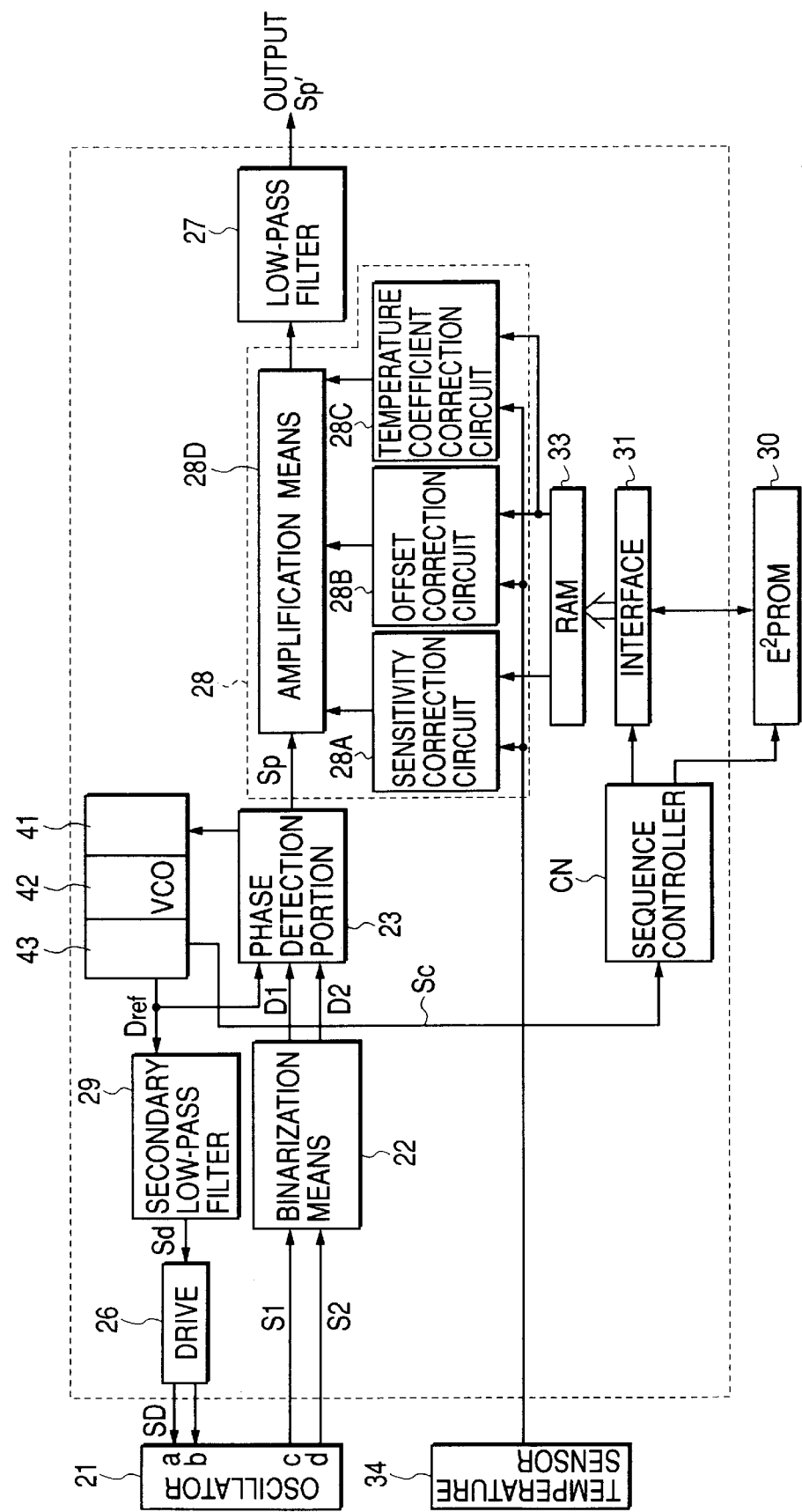
FIG. 1 is a block diagram showing a device for driving and detecting an oscillator according to the present invention as well as part of the construction of an angular speed sensor.
Figure 2:
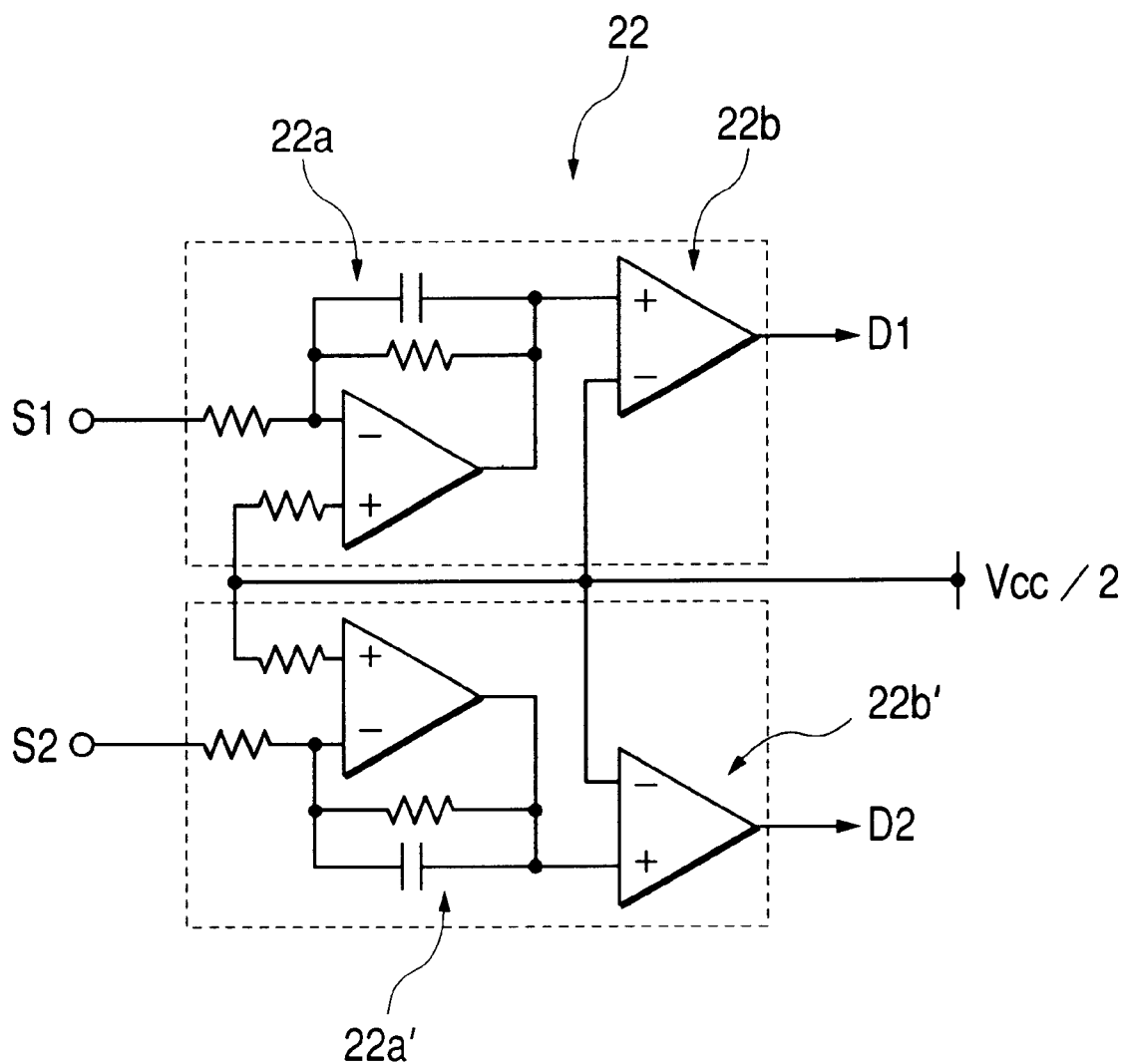
FIG. 2 is a circuit construction view showing the construction of binarization means.
Figure 3:
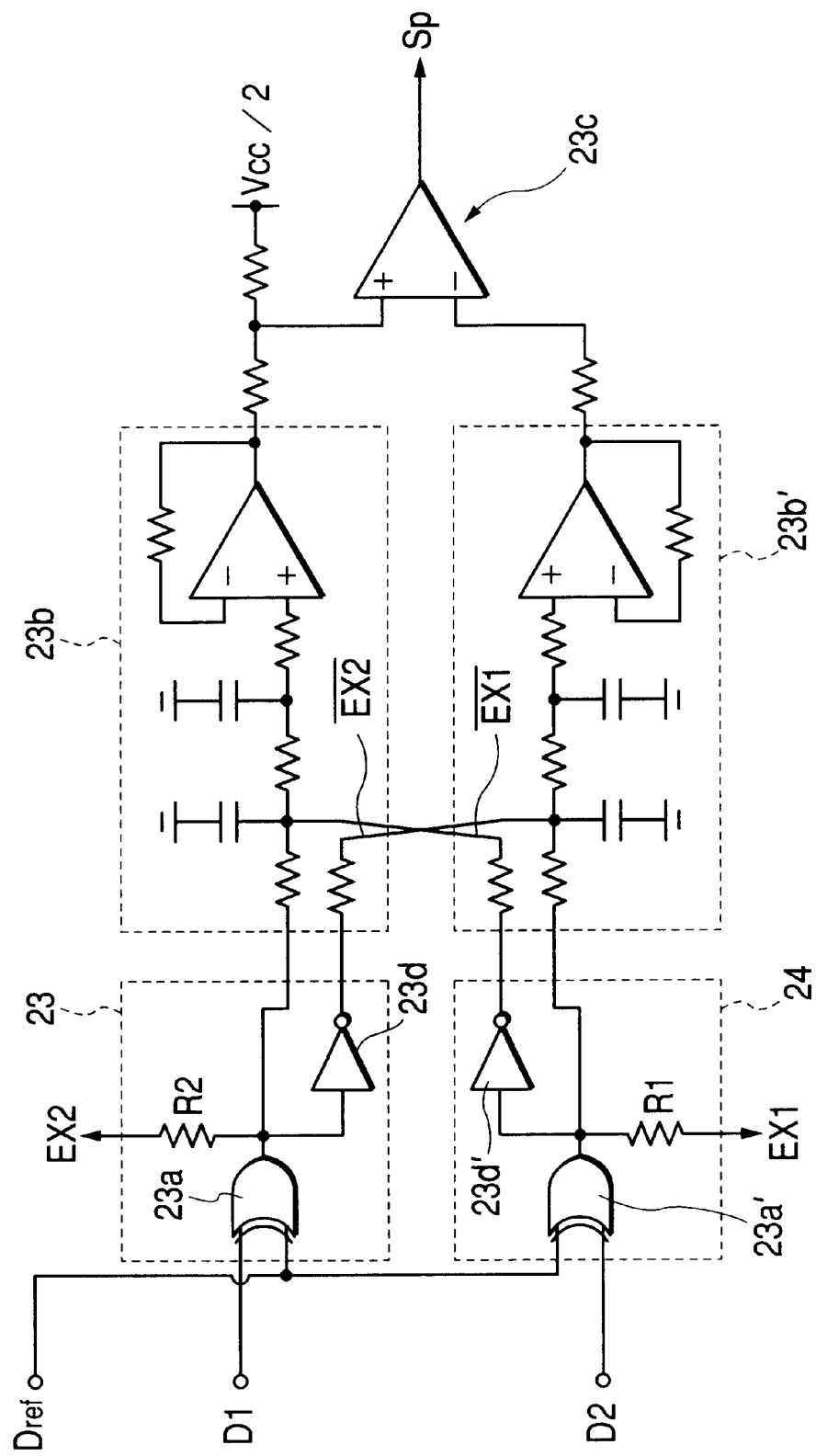
FIG. 3 is a circuit construction view showing a phase difference detection portion.
Figure 4:
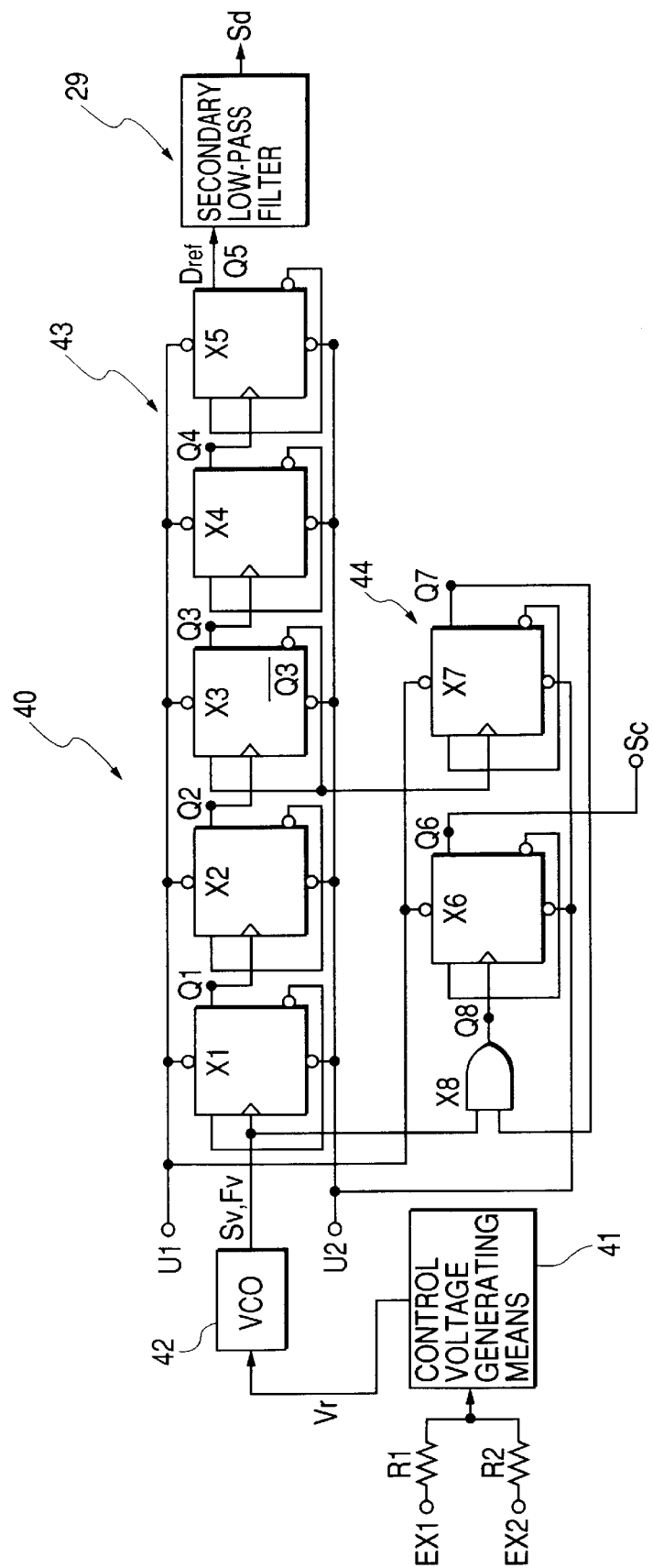
FIG. 4 is a block diagram showing frequency dividing means and rest means.
Figure 5:
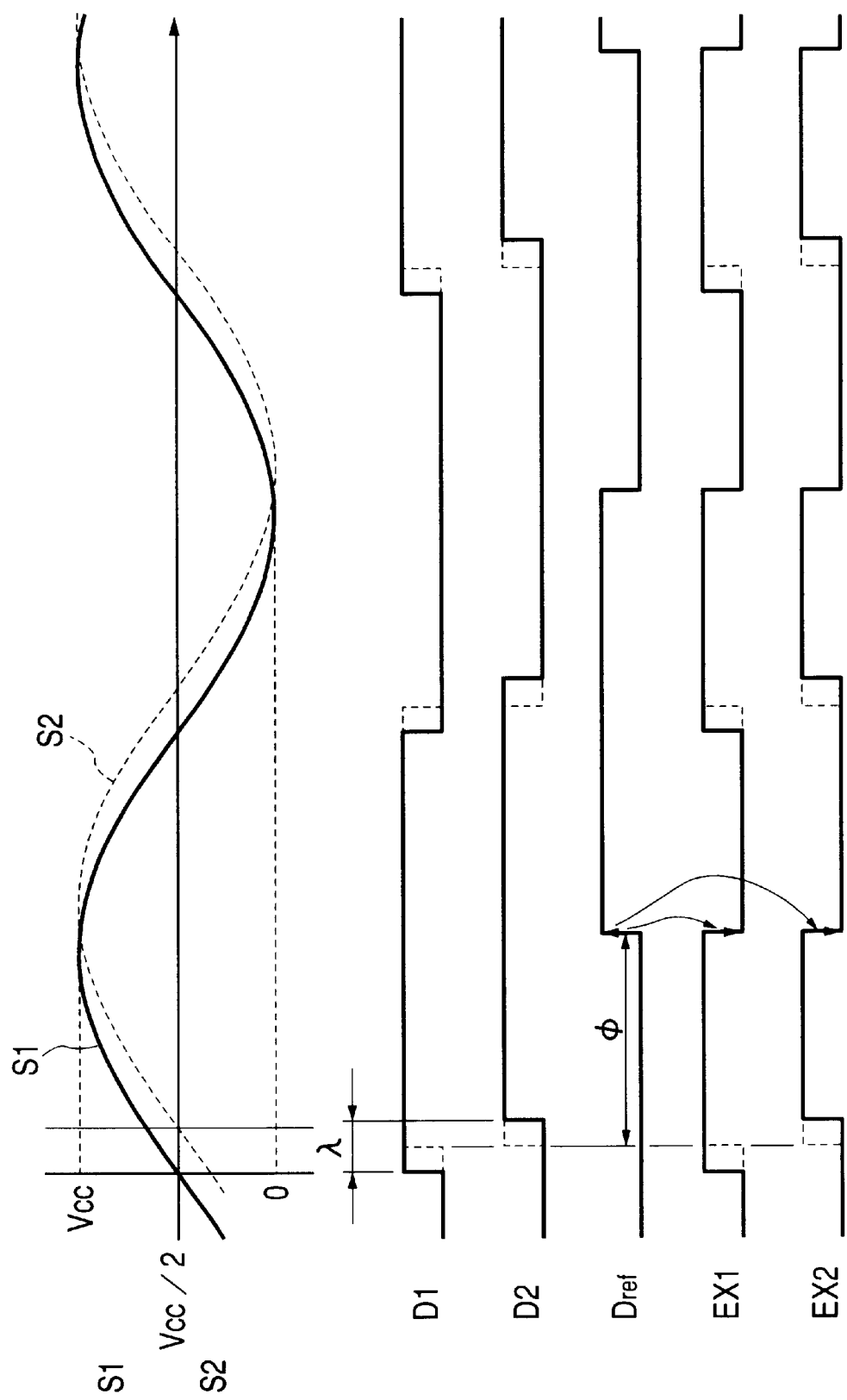
FIG. 5 is a timing chart showing the relation between output signals S1, S2, binary signals D1, D2, reference signal $D_{ref}$, and exclusive outputs EX1, EX2.

FIG. 1 is a block diagram showing a device for driving and detecting an oscillator according to the present invention as well as part of the construction of an angular speed sensor. FIG. 2 is a circuit construction view showing the construction of binarization means. FIG. 3 is a circuit construction view showing a phase difference detection portion. FIG. 4 is a block diagram showing frequency dividing means and rest means. FIG. 5 is a timing chart showing the relation between output signals S1, S2, binary signals D1, D2, reference signal Dref, and exclusive outputs EX1, EX2.

In the block diagram shown in FIG. 1, a drive control portion for driving an oscillator 21 is constructed of the oscillator 21 as its main part, binarization means 22, a phase detection portion 23, control voltage generating means (low-pass filter) 41, a VCO (voltage control oscillator) 42, frequency dividing means 43, a secondary low-pass filter 29, and drive means 26. A detection control portion for detecting the output (angular speed) from the oscillator 21 has the phase detection portion 23, a correction portion 28, a temperature sensor 34, and a low-pass filter 27.

The oscillator 21 is, for example, a piezoelectric type oscillator or a capacitance type oscillator, and has one end of the oscillator 21 extending longitudinally formed in a branched manner, with which a plurality of oscillation legs are formed. A pair of input electrodes a, b extending longitudinally in parallel are formed at both sides of one of the faces of each of the oscillation legs, and output electrodes c, d are likewise formed in the other face thereof. In the oscillator 21, when a sine-wave driving signal SD is given from the drive means 26 to the input electrodes a, b of each of the oscillation legs, the oscillation legs are oscillated and driven in the direction in which the oscillation legs are aligned. In this state, when the oscillator 21 is placed in a rotation system on the longitudinal axis, Coriolis force produced corresponding to the magnitude of the rotation allows the oscillator 21 to be deflected and deformed in the direction orthogonal to the oscillation direction. From this deformation, output signals S1, S2 outputted from the output electrodes c, d formed in the oscillator 21 generate a phase difference λ corresponding to the magnitude of the Coriolis force. In other words, with respect to the output signal S1 generated from one of the output electrodes (for example, the output electrode c) the output signal S2 generated from the other output electrode (for example, the output electrode d) is delayed by the phase difference λ (see FIG. 5).

As shown in FIG. 2, the binarization means 22 has a pair of I-V conversion means (electric current—voltage conversion means) 22a, 22a' and a pair of binarization circuits 22b, 22b'. The output signals S1, S2 of the oscillator 21 is a sine-wave electric current output. The I-V conversion means (electric current—voltage conversion means) 22a, 22a' convert each of the output signals S1, S2 to an output signal consisting of a voltage output. The binarization circuits 22b, 22b' have a comparator having the midpoint potential (Vcc/2) of a power supply voltage Vcc as a threshold value. The binarization circuits 22b, 22b' convert the output signal (sine wave) of the I-V conversion means 22a, 22a' to binary signals D1, D2 of a rectangular wave (digital waveform) in proportion to the pulse width thereof, respectively. In other words, as shown in FIG. 5, the binary signals D1, D2 are converted to an "H" level signal, for example, when the output signals S1, S2 intersect the threshold value (Vcc/2) in the direction from negative (0 side) to positive (Vcc side), and are converted to an "L" level signal when the output signals S1, S2 intersect the threshold value (Vcc/2) in the direction from positive to negative.

As shown in FIG. 3, the phase difference detection portion 23 has a pair of EXor circuits (exclusive-or circuits) 23a, 23a', a pair of low-pass filter portions 23b, 23b', and a differential amplification portion 23c.

One of the input terminals of the EXs or circuits 23a, 23a', is fed the binary signals D1, D2, and the other input terminal is fed a reference signal Dref. The reference signal Dref is a signal 90° C. out of phase with the midpoint of the phase difference λ of the binary signals D1, D2, as described later.

Exclusive outputs EX1, EX2 of the EXor circuits 23a, 23a' are signals consisting of a frequency provided by doubling the binary signals D1, D2 (see FIG. 5). The phase difference detection portion 23 generates exclusive inverted outputs EX1 bar, and EX2 bar, in which the exclusive outputs EX1, EX2 are inverted by inverters 23d, 23d', respectively. The exclusive output EX2 and the exclusive inverted output EX1 bar are connected through a resistance to one low-pass filter portion 23b. The exclusive output EX1 and the exclusive inverted output EX2 bar are also connected through a resistance to the other low-pass filter portion 23b'. In the low-pass filter portions 23b, 23b', a signal provided by adding the exclusive output EX2 and the exclusive inverted output EX1 bar, and a signal provided by adding the exclusive output EX1 and the exclusive inverted output EX2 bar are converted to smoothing voltages integrally smoothed, respectively. These smoothing voltages are inputted through the buffer circuit in the low-pass filter portions 23b, 23b' to the differential amplification portion 23c, and the differential amplification portion 23c detects a voltage corresponding to the phase difference λ, as the angular speed signal Sp. The angular speed signal Sp thus detected is sent out to the correction portion 28 described later.

The exclusive output EX1 and the exclusive output EX2 of the EXor circuits 23a, 23a' are connected through resistances R1, R2 having the same resistance value, and the output from the connection point thereof is outputted to the control voltage generating means (low-pass filter) 41 of the drive control portion. The control voltage generating means (low-pass filter) 41 is constructed of an active low-pass filter (control voltage generating means) using operational amplification means, and generates, from the exclusive output EX1 and the exclusive output EX2, a control voltage Vr increased or decreased from the midpoint potential Vcc/2, in accordance with the change of the phase λ between the output signal S1 and the output signal S2. The control voltage Vr is outputted at a predetermined frequency to the VCO 42 permitting free-running oscillation. A frequency fv of a oscillating signal Sv of the VCO 42 is controlled.

As shown in FIG. 4, the output of the VCO 42 is provided in its rear direction with frequency dividing means 43 and rest means 44. The frequency dividing means 43 cascades, for example, D-type flip-flops (FF) X1, X2, X3, X4 and X5 in five stages, and the oscillating signal Sv of the VCO 42 is inputted to the clock terminal. of the first-stage flip-flop X1. Between the flip-flops X1, X2, X3, X4 and X5, the output Q of the previous-stage non-inverted output terminals is connected to the later-stage clock terminal, and the output Q bar of the inverted output terminals is connected to the self-data input terminal. Outputs Q1, Q2, Q3, Q4 and Q5 of the non-inverted output terminals of the flip-flops X1, X2, X3, X4 and X5 are 1/2, 1/4, 1/8, 1/16 and 1/32 times the oscillating frequency fv of the VCO 42. The output Q5 of the final-stage flip-flop X5 is connected, as the reference signal Dref, to the other input terminal of the EXs or circuits 23a, 23a' and the secondary low-pass filter 29.

The secondary low-pass filter 29 generates a driving signal SD 90° out of phase with the reference signal Dref as the output Q5 of the flip-flop X5. The drive means 26 adjusts the level of the driving signal SD which is then given to the input electrodes a, b of the oscillator 21. The oscillator 21 receives the driving signal SD to be oscillated and driven.

The reference signal Dref has a phase φ shifted 90° with respect to the midpoint of the binary signals D1, D2 provided by binarizing the output signals S1, S2 of the oscillator 21 (see FIG. 5). In other words, the driving and detecting means constructs PLL (phase-locked loop) locked by the reference signal Dref with the phase φ shifted 90° with respect to the midpoint of the phase λ between the output signals S1 and S2 (the midpoint (λ/2) of the binary signals D1 and D2) all the time. When the driving signal SD and the output signals S1, S2 of the oscillator 21 have opposite phases, the output signals S1, S2 are once inverted 180° to maintain the abovementioned relation.

The rest means 44 has two D-type flip-flops X6, X7 and an AND circuit X8. The clock terminal of the flip-flop X7 is fed the output Q3 bar of the flip-flop X3 constructing the frequency dividing means 43, and the output Q7 bar of the flip-flop X7 is inputted to the self-data input terminal. One of the input terminals of the AND circuit X8 is fed the oscillating signal Sv of the VCO 42, and the other terminal is connected to the output Q7 of the flip-flop X7. The clock terminal of the flip-flop X6 is fed the output Q8 of the AND circuit X8, and the output Q6 bar of the flip-flop X6 is returned to the self-data input terminal. The output Q6 of the flip-flop X6 is connected to a sequence controller CN as a timing signal Sc controlling the correction portion 28.

The correction portion 28 has a sensitivity correction circuit 28A, an offset correction circuit 28B, and a temperature coefficient correction circuit 28C, as shown in FIG. 1. These adjust, for each temperature, the sensitivity and the amplitude output offset of the oscillator 21 changed depending on temperature. The respective correction data pieces given to these are stored in an $E^2$PROM (data storing portion) provided outside. The sensitivity correction circuit 28A, the offset correction circuit 28B, and the temperature coefficient correction circuit 28C read the respective initial data pieces by control of the sequence controller CN.

The sequence controller CN generates a command of serial data pieces needed for this, and shifts the respective initial data pieces stored in the E²PROM 30 through an interface 31 to an RAM (memory) 33. This operation is performed in synchronization with the timing signal Sc inputted to the sequence controller CN. The data shifted to the RAM 33 is latched for a fixed time until the next data pieces are shifted. The contents of the E²PROM 30 sent out to the RAM 33 are the initial data pieces, and the contents of the RAM 33 is overwritten with apparently the same contents. The E²PROM (data storing portion) 30, RAM 33, and sequence controller CN construct the data holding means.

The sensitivity correction circuit 28A, the offset correction circuit 28B, and the temperature coefficient correction circuit 28C have D/A conversion means, not shown, respectively. When the correction data pieces of the RAM 33 are overwritten, the respective correction data pieces latched in synchronization therewith are fetched as an analog signal.

A temperature sensor 34 for measuring inner temperature is provided in the vicinity of the oscillator 21. The output of the temperature sensor 34 is inputted to the sensitivity correction circuit 28A, the offset correction circuit 28B, and the temperature coefficient correction circuit 28C, respectively.

The temperature sensor 34 is provided with, for example, a transistor for detecting temperature in the vicinity of the oscillator 21, thereby providing a construction using the base-emitter voltage of the transistor changed lineally to temperature.

The sensitivity correction circuit 28A, the offset correction circuit 28B, and the temperature coefficient correction circuit 28C determines proper correction values based on the temperature data piece detected from the temperature sensor 34, so as to correct the angular speed difference signal Sp outputted from the phase difference detection portion 23. In other words, an amount of voltage corresponding to the proper correction values is sent out, and the gain of amplification means 28D provided in the correction portion 28 is controlled, thereby adjusting the angular speed signal Sp.

The operation of the flip-flops X1 to X7 forming the frequency divider of the PLL will de described.

Figure 6:
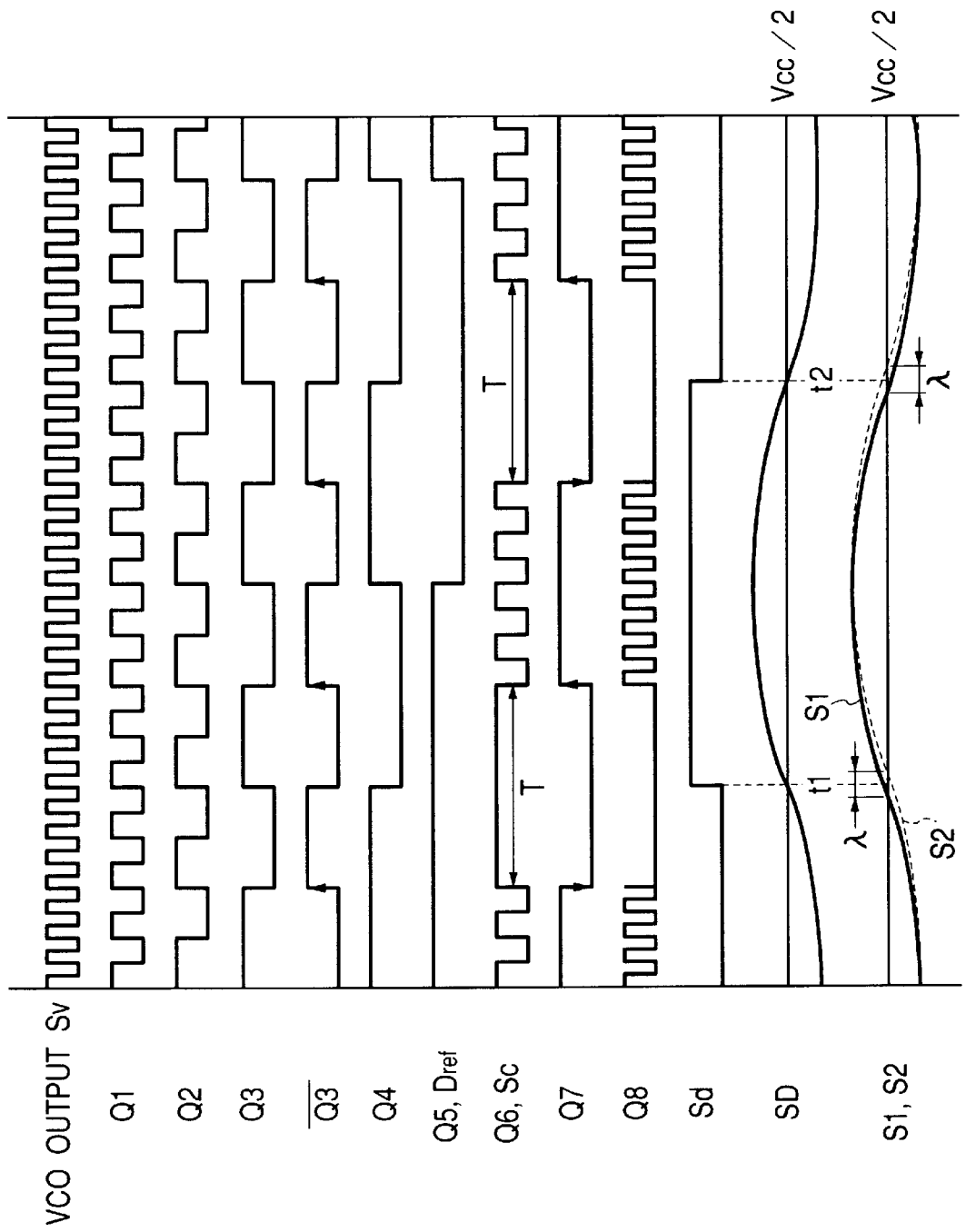
FIG. 6 is a timing chart showing the relation between various signals in the frequency dividing means and the rest means.
Figure 7:
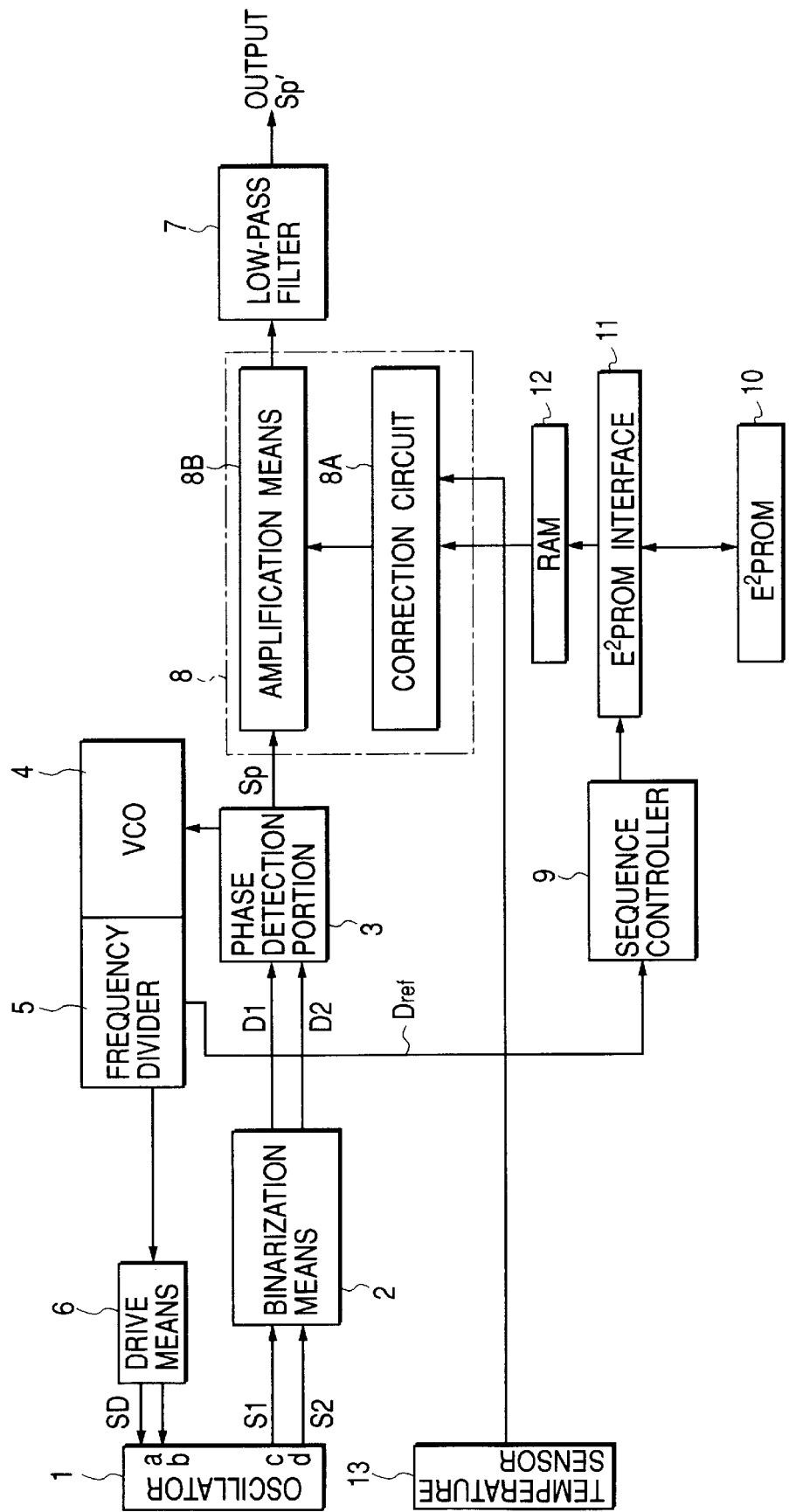
FIG. 7 is a block diagram showing a conventional device for driving and detecting an oscillator as well as the construction of part of an angular speed sensor.

FIG. 6 is a timing chart showing the relation between various signals in the frequency dividing means and the rest means. From the topmost stage of FIG. 6, there are shown the oscillating signal Sv of the VCO 42, the output Q1 of the flip-flop X1, the output Q2 of the flip-flop X2, the output Q3 of the flip-flop X3, the inverted output Q3 bar of the flip-flop X3, the output Q4 of the flip-flop X4, the output Q5 of the flip-flop X5 and the reference signal Dref, the output Q6 of the flip-flop X6 and the timing signal Sc controlling the correction portion 28, the output Q7 of the flip-flop X7, the output Q8 of the AND circuit X8, the output signal of the secondary low-pass filter 29 (the signal 90° out of phase with the reference signal Dref) Sd, the driving signal SD, and the output signals S1, S2 of the oscillator 21.

In FIG. 6, the timings in which the output signal Sd of the secondary low-pass filter 29 is switched from an H level signal to an L level signal, or from the L level signal to the H level signal are times t1, t2, . . . in which the oscillating signal SD intersects the threshold value (Vcc/2). In addition, the timings in which the output signals S1, S2 of the oscillator 21 are switched from the H level signal or the L level signal are times (t1±λ/2, t2±λ/2, . . . ) before and after the times t1, t2, . . . by a phase difference ±λ/2 (approximately, =±0.5 μsec) produced due to the Coriolis force.

The time period before and after the times t1, t2, . . . is provided with a rest period T in which the output Q6 (the timing signal Sc) maintains the H level or L level output for a fixed period of time. Such a rest period T is provided intermittently in the output Q6 (the timing signal Sc).

During the rest period T, since the timing signal Sc is not outputted to the sequence controller CN, the sequence controller CN can be rested. For this reason, it is possible to stop a series of operation in which the respective initial data pieces stored in the E²PROM 30 are shifted through the interface 31 to the RAM 33. Al least during the rest period T, it is possible to prevent noise liable to be produced when the respective initial data pieces of the E²PROM 30 are written into the RAM 33. Whisker noise can be prevented from being included into the output signals S1, S2 of the oscillator 21.

The binarization means 22 can prevent the output signals S1, S2 or the threshold value from being varied due to influence of noise. The output signals S1, S2 can be binarized to the binary signals S1, D2 with high accuracy. The phase difference at very short time intervals can be detected precisely.

The correction portion 28 writes the initial data pieces having always the same contents into the RAM 33. The initial data pieces overwritten before the rest time Tare latched in the RAM 33. Even when, as described above, the rest period T is present and a state where overwriting of the RAM 33 is not performed periodically is present, the sensitivity correction circuit 28A, the offset correction circuit 28B, and the temperature coefficient correction circuit 28C permits correction based on the data pieces latched in the RAM 33. The influence on the angular speed signal Sp' after correction can be reduced.

In the abovementioned embodiment, the oscillation signal Sv of the output Q3 bar of the flip-flop X3 of the frequency dividing means 43 and the oscillating signal Sv of the VCO 42 set the rest period T, but the present invention is not limited to this. When the timing signal Sc of the sequence controller CN of the correction portion can be stopped reliably before and after the times t1, t2, . . . , other signals may be combined to set the rest period T.

The rest period is effective for removing noise of the circuit in which the noise-sensitive timing appears timewise repeatedly. For example, an analog delay circuit may be used as a method for generating the rest period.

According to the present invention, overwriting of the data pieces in the correction portion can be rested for a period before and after the binarization means switches signals. The binary signals can be prevented from varied.

The oscillator can be driven stably, and the angular speed can be detected at a high accuracy.

What is claimed is:
1. A device for driving an oscillator and detecting an oscillator output comprising an oscillator for outputting output signals of different phases when an angular speed is given, a drive control portion for driving the oscillator, and a detection control portion for detecting the angular speed output based on the output signals of the oscillator,
the detection control portion having binarization means for converting the both output signals to binary signals corresponding to the amplitude polarity, a phase detection portion for detecting the angular speed output based on the phase difference component between the both binary signals, a correction portion for performing a correction process for the output of the phase detection portion corresponding to the characteristic of the oscillator, and data holding means provided in the correction portion for holding the contents of memory overwritten with data pieces stored in a data store portion, wherein the operation of the data holding means is controlled so as to temporarily rest the overwriting of the memory for a fixed period including the time for switching the amplitude polarities in the binarization means.

2. The device for driving an oscillator and detecting an oscillator output according to claim 1, further comprising a controller for controlling the overwriting process for the memory in the data holding means, wherein supply of a timing signal (Sc) as the operational reference of the controller is stopped for the fixed period, so as to temporarily rest the overwriting of the memory.

3. The device for driving an oscillator and detecting an oscillator output according to claim 1, wherein the drive control portion has a voltage control oscillator for controlling the oscillating frequency based on the output signals of the oscillator, and frequency dividing means for frequency-dividing a signal outputted from the voltage control oscillator so as to generate a driving signal of the oscillator, wherein the outputs of flip-flops constructing the frequency dividing means are combined to generate the timing signal (Sc) having the rest period.

4. The device for driving an oscillator and detecting an oscillator output according to claim 1, wherein the oscillator is a piezoelectric type oscillator or a capacitance type oscillator.

* * * * *